Reissued Apr. 9, 1935 Re. 19,527

UNITED STATES PATENT OFFICE 19,527

AZO DYESTUFF AND PROCESS OF MAKING SAME

August Leopold Laska and Arthur Zitscher, Offenbach-on-the-Main, Germany, assignors to I. G. Farbenindustrie Aktiengesellschaft, Frankfort-on-the-Main, Germany No Drawing. Original No. 1,457,114, dated May 29, 1923, Serial No. 611,503, January 8, 1923. Application for reissue August 28, 1932, Serial No. 687,240

3 Claims. (Cl. 260—95)

Our invention relates to especially valuable dyestuffs, more particularly it relates to water-insoluble azo dyestuffs, which can be obtained by combining a diazo compound of a mononuclear aromatic amine in which the nucleus may be substituted by one or more substituents selected from the group consisting of halogen, alkyl, alkoxy and nitro groups but which does not contain any group causing solubility, such as the sulfonic acid or carboxylic acid group, with an othro-alkoxyarylide of the 2, 3-hydroxynaphthoic acid of the general formula:

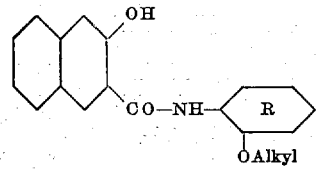

wherein the nucleus R may be substituted by a substituent selected from the group consisting of halogen, alkyl, alkoxy and nitro groups.

The new dyestuffs are represented by the general formula:

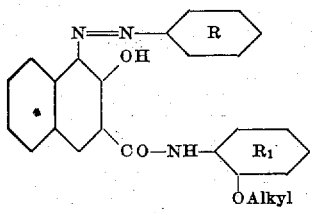

wherein the nuclei R and $R_1$ may be substituted by substituents selected from the group consisting of halogen, alkyl, alkoxy and nitro groups.

The dyestuffs can be used for the production of color lakes of an excellent fastness to light and give, when produced on the fiber, orange to red and Bordeaux shades of a singular fastness to light, they are when dry, orange to red and brownish powders, insoluble in water, soluble in sulfuric acid to a violet to green solution yielding upon reduction with stannous chloride an amine and an ortho-alkoxyarylamide of the 1-amino-2-hydroxy-3-naphthoic acid.

The invention is illustrated by the following examples:

1. A diazo-solution, prepared in the usual manner from 16.2 parts of 2,5-dichloroaniline, is poured, while stirring well, into an aqueous suspension of 30.7 parts of ortho-anisidide of the 2,3-hydroxynaphthoic acid, prepared by dissolving it in dilute caustic soda lye and precipitating with dilute acetic acid. The dyestuff separates in brightly reddish flakes, it is filtered, when the combination is complete, washed until neutral and advantageously used in the form of a paste. Mixed with the usual substrata it forms color lakes of an excellent fastness to light.

The dyestuff has the following structural formula:

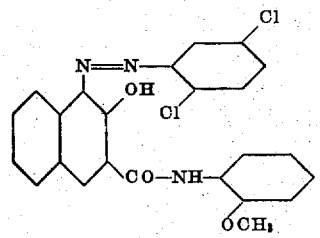

Instead of ortho-anisidide we may use orthophenetidide of the 2,3-hydroxynaphthoic acid.

2. Production of the Dyestuffs on the Fiber

*Padding bath*

10 grams of ortho-anisidide of 2,3-hydroxynaphthoic acid are well stirred with 20 cc. of caustic soda lye of 34° Bé. and 20 cc. of Turkey red oil, dissolved with 200 cc. of hot water and made up to 1 liter.

The cotton goods, which are impregnated with this solution, are well wrung out and then developed in the following:

*Dye-bath*

3 grams of 4-chloro-1,2-toluidine are diazotized in the usual manner, the solution is diluted with cold water to 1 liter, neutralized with sodium acetate and 50 grams of common salt are added.

The dyed goods are rinsed, as usually, with cold and warm water, then soaped, while boiling well, rinsed again and dried.

*Printing-directions*

The textile fabric is impregnated with a solution of 12 grams of 5-chloro-ortho anisidide of 2,3-hydroxynaphthoic acid per liter, dried and then printed with the following printing-color:

300 grams of 4-chloro-1,2-toluidine are diazotized in the usual manner and the diazo-solution is made up to 10 liters.

Printing-color:
4500 cc. of the diazo solution,
4000 grams of tragacanth thickening 1:20,
1000 cc. of aluminium sulfate 1:1,
500 cc. of sodium acetate 1:1, 10 kg.

After printing the goods are dried at 40° C. to 50° C., soaped with a warm and feebly alkaline solution of soap and rinsed with hot water.

The following table gives the tints of a number of the dyestuffs, prepared according to the present process, and of the color lakes obtained therefrom:

| | Diazo compound of: | Combined with: | Shades: |
|---|---|---|---|
| 1 | 3-chloroaniline | Ortho-anisidide of 2, 3-hydroxynaphthoic acid | Orange. |
| 2 | 2-chloroaniline | do | Yellowish red. |
| 3 | 2, 5-dichloroaniline | do | Yellowish red. |
| 4 | 4-chloro-1, 2-toluidine | do | Red. |
| 5 | 5-chloro-1, 2-toluidine | do | Bluish red |
| 6 | 6-chloro-1, 2-toluidine | do | Red. |
| 7 | 4-chloro-1, 3-toluidine | do | Yellowish red. |
| 8 | 4-chloro-1, 2-anisidine | do | Bluish red. |
| 9 | 5-nitro-1, 2-anisidine | do | Bordeaux. |
| 10 | 4-nitro-1, 2-anisidine | do | Red. |
| 11 | 4-nitro-1, 2-toluidine | do | Yellowish red |
| 12 | 5-nitro-1, 2-toluidine | do | Bordeaux. |
| 13 | 3-nitro-1, 4-toluidine | do | Bordeaux. |
| 14 | 4-chloro-2-nitroaniline | do | Bordeaux. |
| 15 | 3-nitro-1, 4-toluidine | Ortho-phenetidide of 2, 3-hydroxynaphthoic acid. | Red. |
| 16 | 4-chloro-2-nitroaniline | do | Bluish red. |
| 17 | Dianisidine | do | Reddish blue. |
| 18 | Ortho-phenetole-azo-alpha-naphthylamine | do | Black. |
| 19 | 4-chloro-1, 2-toluidine | 2, 3-hydroxynaphthoyl-4-chloro-1, 2-anisidine | Red. |
| 20 | 5-chloro-1, 2-toluidine | do | Bluish red. |
| 21 | 6-chloro-1, 2-toluidine | do | Red. |
| 22 | 2-chloro-1, 4-toluidine | do | Red. |
| 23 | 3-chloro-1, 4 toluidine | do | Red. |
| 24 | 4-chloro-2-nitroaniline | do | Bluish red. |
| 25 | 4-chloro-1, 2-anisidine | do | Bordeaux. |
| 26 | 5-chloro-1, 2-anisidine | do | Reddish Bordeaux. |
| 27 | 4-nitro-1, 2-anisidine | do | Bluish red. |
| 28 | 5-nitro-1, 2-toluidine | do | Red. |
| 29 | 3-nitro-1, 4-toluidine | do | Reddish Bordeaux. |
| 30 | m-aminoazotoluene | do | Like garnet. |
| 31 | 5-chloro-1, 2-toluidine | 2, 3-hydroxynaphthoyl-5-chloro-1, 2-anisidine | Bluish red. |
| 32 | 6-chloro-1, 2-toluidine | do | Yellowish red. |
| 33 | 4-chloro-1, 2-anisidine | do | Bordeaux. |
| 34 | 3-nitro-1, 4-toluidine | do | Bordeaux. |
| 35 | 3-nitro-1, 4-toluidine | 2, 3-hydroxynaphthoyl-4-nitro-1, 2-anisidine | Bluish red. |
| 36 | 5-nitro-1, 2-anisidine | do | Reddish Bordeaux. |
| 37 | 2, 5-dichloroaniline | 2, 3-hydroxynaphthoyl-3-amino-1, 4-cresolmethylether. | Yellowish red. |
| 38 | 3-nitro-1, 4-toluidine | do | Bluish red. |
| 39 | 5-nitro-1, 2-toluidine | do | Bordeaux. |
| 40 | 2, 5-dichloro-aniline | 2, 3-hydroxynaphthoyl-3-amino-1, 4-cresolethylether. | Yellowish red. |
| 41 | 3-nitro-1, 4-toluidine | do | Bluish red. |
| 42 | 5-nitro-1, 2-toluidine | do | Bluish red. |
| 43 | 4-nitro-1, 2-anisidine | 2, 3-hydroxynaphthoyl-aminohydroquinone-dimethylether. | Red. |
| 44 | 4-chloro-1, 2-anisidine | do | Bluish red. |
| 45 | 2, 5-dichloroaniline | do | Brownish orange. |

Since an object of the present invention is to provide dyestuffs of good fastness properties, which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azo dyestuffs of the general formula:

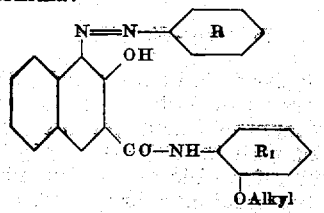

wherein the nuclei R and $R_1$ may be substituted by a substituent selected from the group consisting of halogen, alkyl, alkoxy and nitro groups.

2. The water-insoluble azo dyestuffs of the general formula:

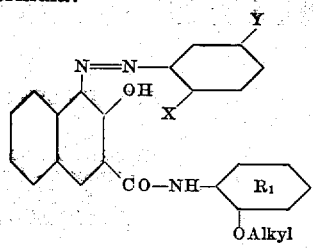

wherein X and Y stand for chlorine atoms or for different substituents selected from the group consisting of Cl, $CH_3$, $OCH_3$ and $NO_2$, and the nucleus $R_1$ may be substituted by a substituent selected from the group consisting of Cl, $CH_3$, $OCH_3$ and $NO_2$.

3. The water-insoluble azo dyestuff of the formula:

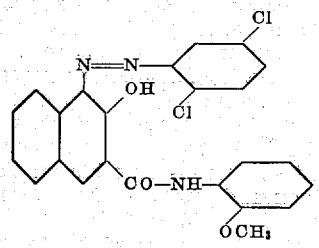

AUGUST LEOPOLD LASKA.
ARTHUR ZITSCHER.